United States Patent
Du et al.

(10) Patent No.: US 9,678,847 B2
(45) Date of Patent: Jun. 13, 2017

(54) METHOD AND APPARATUS FOR SHORT FAULT DETECTION IN A CONTROLLER AREA NETWORK

(71) Applicant: GM GLOBAL TECHNOLOGY OPERATIONS LLC, Detroit, MI (US)

(72) Inventors: Xinyu Du, Oakland Township, MI (US); Shengbing Jiang, Rochester Hills, MI (US); Atul Nagose, Royal Oak, MI (US); Yilu Zhang, Northville, MI (US); Natalie Ann Wienckowski, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 75 days.

(21) Appl. No.: 14/720,332

(22) Filed: May 22, 2015

(65) Prior Publication Data
US 2015/0347258 A1 Dec. 3, 2015

Related U.S. Application Data

(60) Provisional application No. 62/003,314, filed on May 27, 2014.

(51) Int. Cl.
*G06F 11/30* (2006.01)
*G06F 11/20* (2006.01)
*G06F 11/07* (2006.01)

(52) U.S. Cl.
CPC ...... *G06F 11/3013* (2013.01); *G06F 11/0739* (2013.01); *G06F 11/0751* (2013.01); *G06F 11/2007* (2013.01); *G06F 11/3027* (2013.01); *G06F 11/3062* (2013.01)

(58) Field of Classification Search
USPC .......................................... 714/4.5
See application file for complete search history.

(56) References Cited

U.S. PATENT DOCUMENTS

| | | | | | |
|---|---|---|---|---|---|
| 5,781,585 | A * | 7/1998 | Dorner | ............... | H04L 12/2602 327/64 |
| 6,587,968 | B1 * | 7/2003 | Leyva | ............... | H04L 12/40032 714/43 |
| 6,760,857 | B1 * | 7/2004 | Lau | ................. | G11C 29/12015 713/500 |
| 6,970,953 | B2 * | 11/2005 | Gregory | ............. | G06F 13/4086 710/15 |
| 7,257,740 | B2 * | 8/2007 | Muth | ............... | H04L 12/40032 714/43 |
| 7,855,573 | B1 * | 12/2010 | Yost | .................... | G06F 13/4086 326/30 |
| 8,495,162 | B2 * | 7/2013 | Suzuki | ............... | H04N 5/23203 370/458 |
| 2004/0158781 | A1 * | 8/2004 | Pihet | .................. | H04L 12/2602 714/712 |
| 2007/0120574 | A1 * | 5/2007 | Houston | ............. | H04L 25/0298 326/30 |

(Continued)

*Primary Examiner* — Kamini Patel

(57) ABSTRACT

A controller area network (CAN) includes a CAN bus having a CAN-H wire, a CAN-L wire, and a pair of CAN bus terminators located at opposite ends of the CAN bus. The CAN further includes a plurality of nodes including controllers wherein at least one of the controllers is a monitoring controller. The monitoring controller includes a CAN monitoring routine for detecting a wire short fault in the CAN bus and its location.

3 Claims, 3 Drawing Sheets

(56) References Cited

U.S. PATENT DOCUMENTS

| | | | | |
|---|---|---|---|---|
| 2008/0224687 A1* | 9/2008 | Breese | ............... | G01R 31/3631 |
| | | | | 324/76.11 |
| 2009/0183033 A1* | 7/2009 | Ando | .................. | H04L 43/0823 |
| | | | | 714/43 |
| 2013/0094353 A1* | 4/2013 | Monroe | .............. | H04L 12/4135 |
| | | | | 370/225 |
| 2014/0149801 A1* | 5/2014 | Jiang | ................... | G06F 11/2005 |
| | | | | 714/43 |
| 2015/0082089 A1* | 3/2015 | Jiang | ................... | G06F 11/3048 |
| | | | | 714/25 |
| 2015/0113328 A1* | 4/2015 | Jiang | ..................... | G06F 11/079 |
| | | | | 714/37 |
| 2015/0312123 A1* | 10/2015 | Zhang | ................. | G06F 11/0745 |
| | | | | 709/224 |
| 2015/0346259 A1* | 12/2015 | Jiang | ................... | H04L 43/0811 |
| | | | | 324/538 |
| 2015/0346260 A1* | 12/2015 | Jiang | ................... | G06F 11/0739 |
| | | | | 324/538 |
| 2016/0196230 A1* | 7/2016 | Pihet | ................... | G06F 13/4027 |
| | | | | 710/314 |

* cited by examiner

METHOD AND APPARATUS FOR SHORT FAULT DETECTION IN A CONTROLLER AREA NETWORK

CROSS REFERENCE TO RELATED APPLICATIONS

This application claims the benefit of U.S. Provisional Application No. 62/003,314, filed on May 27, 2014, which is incorporated herein by reference.

TECHNICAL FIELD

This disclosure relates to fault isolation for communications in controller area networks.

BACKGROUND

The statements in this section merely provide background information related to the present disclosure. Accordingly, such statements are not intended to constitute an admission of prior art.

Vehicle systems include a plurality of subsystems, including by way of example, engine, transmission, ride/handling, braking, HVAC, and occupant protection. Multiple controllers may be employed to monitor and control operation of the subsystems. The controllers can be configured to communicate via a controller area network (CAN) to coordinate operation of the vehicle in response to operator commands, vehicle operating states, and external conditions. A fault can occur in one of the controllers that affects communications via a CAN bus.

Topology of a network such as a CAN refers to a connective arrangement among network elements, and preferably includes a plurality of nodes having interconnected or dispersed power, ground or communications links. A physical topology describes arrangement or layout of physical elements including links and nodes, wherein nodes include controllers and other connected devices and links include either power, ground or communications links in the form of suitable cables, wires, printed wiring boards (PWBs), printed circuit boards (PCBs), flexible strips, and the like. A logical topology describes flow of data messages, power or grounding within a network between nodes employing power, ground or communications links. Known CAN systems employ a bus topology for the communication connection among all the controllers that can include a linear topology, a star topology, or a combination of star and linear topologies. Known high-speed CAN systems employ linear and star topologies, whereas known low-speed CAN systems employ a combination of the star and linear topologies. Known CAN systems employ separate power and ground topologies for the power and ground lines to all the controllers. Known controllers communicate with each other through messages that are sent at different periods on the CAN bus.

Known systems detect faults at a message-receiving controller, with fault detection accomplished for the message using signal supervision and signal time-out monitoring at an interaction layer of the controller. Faults can be reported as a loss of communications, e.g., a loss of a communicated data message. Such detection systems generally are unable to identify and locate a root cause of a fault, and are unable to distinguish transient and intermittent faults.

SUMMARY

A controller area network (CAN) includes a CAN bus having a CAN-H wire, a CAN-L wire, and a pair of CAN bus terminators located at opposite ends of the CAN bus. The CAN further includes a plurality of nodes including controllers wherein at least one of the controllers is a monitoring controller. The monitoring controller includes a CAN monitoring routine for detecting a wire short fault in the CAN bus and its location.

BRIEF DESCRIPTION OF THE DRAWINGS

One or more embodiments will now be described, by way of example, with reference to the accompanying drawings, in which.

DETAILED DESCRIPTION

Figure 1:
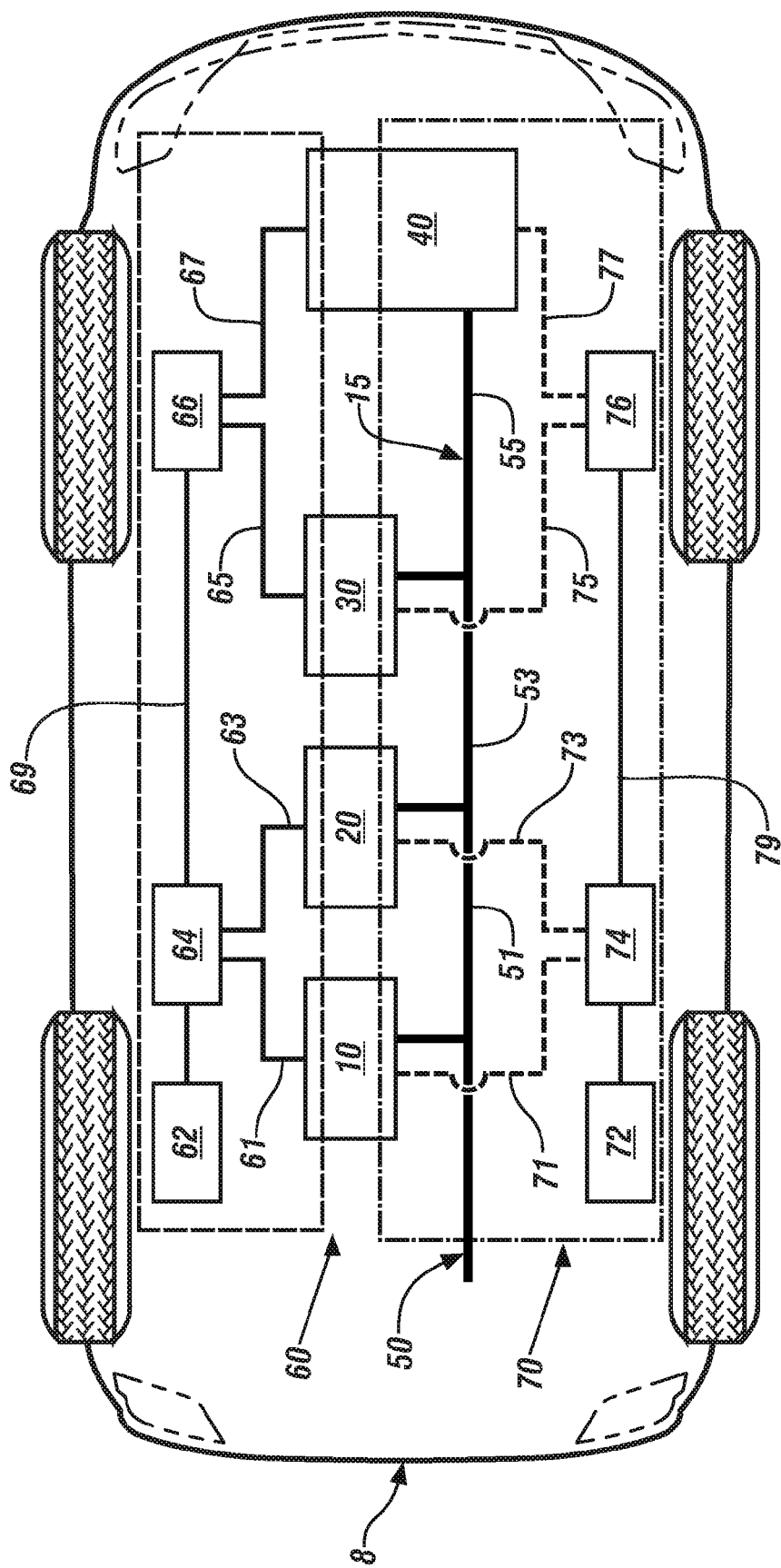
FIG. 1 illustrates a vehicle including a controller area network (CAN) with a CAN bus and a plurality of nodes, e.g., controllers, in accordance with the disclosure.

Referring now to the drawings, wherein the showings are for the purpose of illustrating certain exemplary embodiments only and not for the purpose of limiting the same, FIG. 1 schematically illustrates a vehicle 8 including a controller area network (CAN) 50 including a CAN bus 15 and a plurality of nodes, i.e., controllers 10, 20, 30 and 40. The term "node" refers to any active electronic device that signally connects to the CAN bus 15 and is capable of sending, receiving, or forwarding information over the CAN bus 15. Each of the controllers 10, 20, 30 and 40 signally connects to the CAN bus 15 and electrically connects to a power grid 60 and a ground grid 70. Each of the controllers 10, 20, 30 and 40 includes an electronic controller or other on-vehicle device that is configured to monitor or control operation of a subsystem of the vehicle 8 and communicate via the CAN bus 15. In one embodiment, one of the controllers, e.g., controller 40, is configured to monitor the CAN 50 and the CAN bus 15, and may be referred to herein as a CAN controller. The illustrated embodiment of the CAN 50 is a non-limiting example of a CAN, which may be employed in any of a plurality of system configurations.

The CAN bus 15 includes a plurality of communications links, including a first communications link 51 between controllers 10 and 20, a second communications link 53 between controllers 20 and 30, and a third communications link 55 between controllers 30 and 40. The power grid 60 includes a power supply 62, e.g., a battery that electrically connects to a first power bus 64 and a second power bus 66 to provide electric power to the controllers 10, 20, 30 and 40 via power links. As shown, the power supply 62 connects to the first power bus 64 and the second power bus 66 via power links that are arranged in a series configuration, with power link 69 connecting the first and second power buses 64 and 66. The first power bus 64 connects to the controllers 10 and 20 via power links that are arranged in a star configuration, with power link 61 connecting the first power bus 64 and the controller 10 and power link 63 connecting the first power bus 64 to the controller 20. The second power bus 66 connects to the controllers 30 and 40 via power links that are arranged in a star configuration, with power link 65 connecting the second power bus 66 and the controller 30 and power link 67 connecting the second power bus 66 to the controller 40. The ground grid 70 includes a vehicle ground 72 that connects to a first ground bus 74 and a second ground bus 76 to provide electric ground to the controllers 10, 20, 30 and 40 via ground links. The vehicle ground 72 connects to the first ground bus 74 and the second ground bus 76 via ground links that are arranged in a series configuration, with ground link 79 connecting the first and second ground buses 74 and 76. The first ground bus 74 connects to the controllers 10 and 20 via ground links that are arranged in a star configuration, with ground link 71 connecting the first ground bus 74 and the controller 10 and ground link 73 connecting the first ground bus 74 to the controller 20. The second ground bus 76 connects to the controllers 30 and 40 via ground links that are arranged in a star configuration, with ground link 75 connecting the second ground bus 76 and the controller 30 and ground link 77 connecting the second ground bus 76 to the controller 40. Other topologies for distribution of communications, power, and ground for the controllers 10, 20, 30 and 40 and the CAN bus 15 can be employed with similar effect.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 100 microseconds, 3.125, 6.25, 12.5, 25 and 100 milliseconds during ongoing engine and vehicle operation. Alternatively, routines may be executed in response to occurrence of an event.

Each of the controllers 10, 20, 30 and 40 transmits and receives messages across the CAN 50 via the CAN bus 15, with message transmission rates occurring at different periods for different ones of the controllers. A CAN message has a known, predetermined format that includes, in one embodiment, a start of frame (SOF), an identifier (11-bit identifier), a single remote transmission request (RTR), a dominant single identifier extension (IDE), a reserve bit (r0), a 4-bit data length code (DLC), up to 64 bits of data (DATA), a 16-bit cyclic redundancy check (CRC), 2-bit acknowledgement (ACK), a 7-bit end-of-frame (EOF) and a 3-bit interframe space (IFS). A CAN message can be corrupted, with known errors including stuff errors, form errors, ACK errors, bit 1 errors, bit 0 errors, and CRC errors. The errors are used to generate an error warning status including one of an error-active status, an error-passive status, and a bus-off error status. The error-active status, error-passive status, and bus-off error status are assigned based upon increasing quantity of detected bus error frames, i.e., an increasing bus error count. Known CAN bus protocols include providing network-wide data consistency, which can lead to globalization of local errors. This permits a faulty, non-silent controller to corrupt a message on the CAN bus 15 that originated at another of the controllers. A faulty, non-silent controller is referred to herein as a fault-active controller. When one of the controllers is assigned the bus-off error status, it is prohibited from communicating on the CAN bus for a period of time. This includes prohibiting the affected controller from receiving messages and from transmitting messages until a reset event occurs, which can occur after an elapsed period of time when the controller is inactive. Thus, when a fault-active controller is assigned the bus-off error state, it is prohibited from communicating on the CAN bus for a period of time, and is unable to corrupt other messages on the CAN bus during the period of time when it is inactive.

Figure 2:
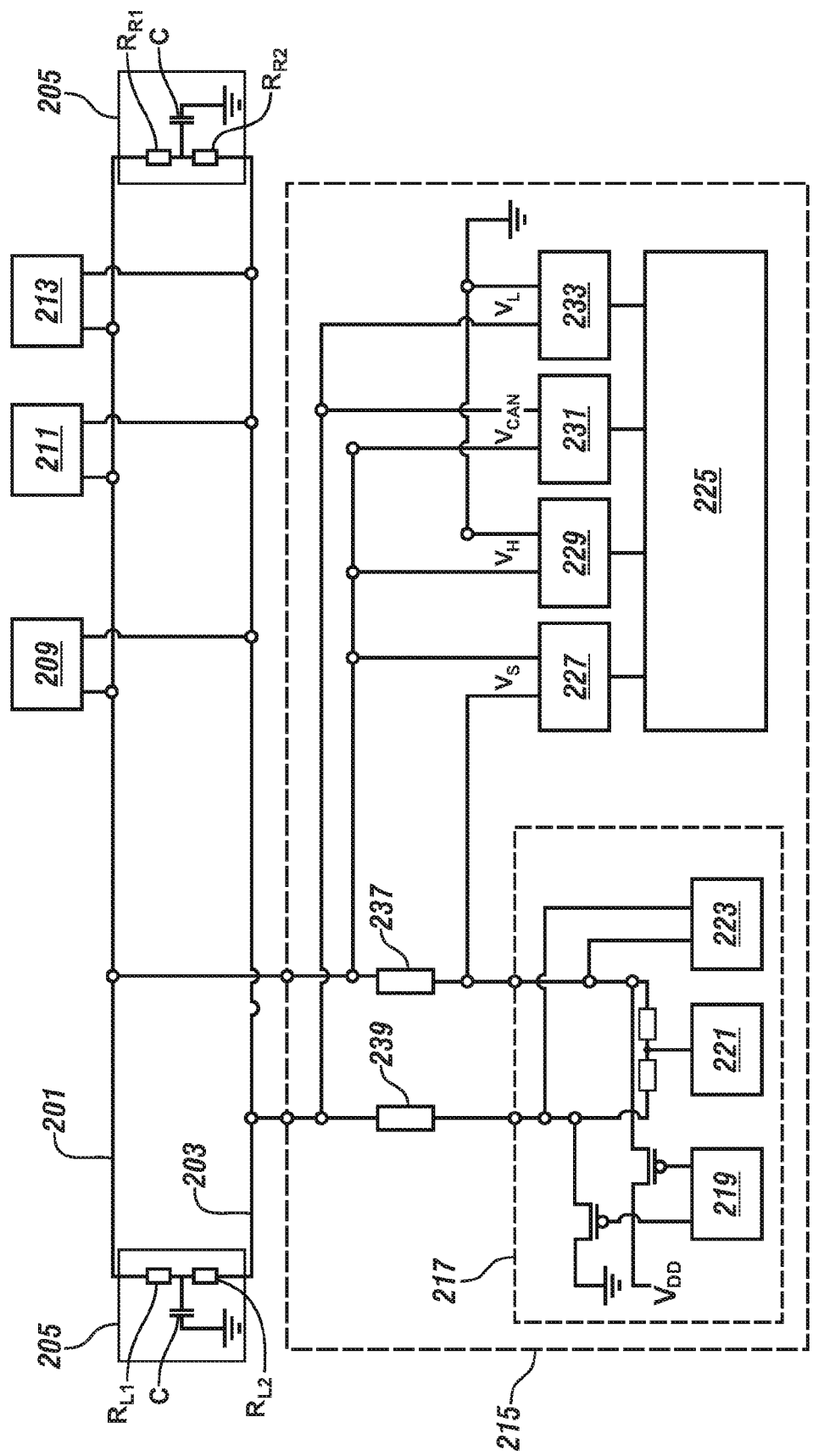
FIG. 2 illustrates an integrated controller area network similar to the CAN of FIG. 1, including a two-wire CAN bus, a plurality of nodes, e.g., controllers, and a monitoring controller, in accordance with the disclosure.

FIG. 2 illustrates one embodiment of an integrated controller area network similar to the CAN shown with reference to FIG. 1, including a two-wire CAN bus including wire cables CAN-H 201 and CAN-L 203 electrically connected between terminators 205, 207 in a split termination configuration. Each of the terminators electrically connects to ground via a respective pair of resistors and a respective capacitive element. The resistors in each pair are in series and the pair is coupled at one end to the CAN-H wire and at the other end to the CAN-L wire. The terminator to the left in the figure is labeled with upper and lower resistors $R_{L1}$ and $R_{L2}$, whereas the terminator to the right in the figure is labeled with upper and lower resistors $R_{R1}$ and $R_{R2}$. Upper resistors $R_{L1}$ and $R_{R1}$ each couple to the CAN-H bus wire at opposite ends of the bus, whereas lower resistors $R_{L2}$ and $R_{R2}$ each couple to the CAN-L bus wire at opposite ends of the bus. The capacitors in each terminator are labeled C and are coupled between ground and the node between the respective pair of resistors. Thus in the split configuration termination each terminator has a total resistance equal to the series combination of the respective pairs of upper and lower resistors. And, the total CAN bus resistance (i.e. between CAN-H wire and CAN-L wire) is substantially equal to the termination resistances of the terminators in parallel. In one embodiment all of the terminator resistors are equivalent having a value of 60Ω, and the capacitive elements are equivalent having a value of 4.7 nF. Thus each terminator has a total resistance equal 120Ω. And, the total CAN bus resistance (i.e. between CAN-H wire and CAN-L wire) is substantially equal to 60Ω. Alternative configurations are envisioned wherein the total resistance of each terminator is equivalent to the other but the upper and lower resistors each have a different value. Alternative configurations are envisioned wherein the total resistance of each terminator is equivalent to the other, the upper resistors are equivalent to each other, the lower resistors are equivalent to each other, but the upper and lower resistors are not equivalent to each other. In any envisioned alternative, it may be desirable that the total CAN bus resistance (i.e. between CAN-H wire and CAN-L wire) is substantially equal to 60Ω or some other industry standard.

A plurality of nodes, e.g., controllers ECU1 209, ECU2 211, ECU3 213 and ECU-M 215 signally connect to the CAN. As shown, ECU-M 215 is a monitoring controller. Each of the controllers may be capable of monitoring and providing the same or similar diagnostic functionality as that described with respect to ECU-M 215. The split termination configuration improves electromagnetic compatibility by eliminating common-mode errors.

The monitoring controller ECU-M 215 includes a CAN transceiver device 217 including a signal transmitter 219, a bias control 221 and a receiver 223 that signally connect to the wire cables CAN-H 201 and CAN-L 203 of the CAN bus via first and second shunt resistors (Rs1 237, Rs2 239), respectively. The first and second shunt resistors are highprecision, low impedance devices each preferably having a value at or near 1.0Ω and preferably of the same resistance value. The monitoring controller ECU-M 215 also includes a microcontroller (MCU) 225 that signally connects to a plurality of analog-to-digital converters (ADC1 227, ADC2 229, ADC3 231, ADC4 233) and a plurality of executable control routines.

Resistance is introduced into the CAN by connecting the controllers ECU1 209, ECU2 211, ECU3 213. Resistance is also introduced into the CAN by the terminators 205, 207. Resistance is introduced into the CAN by the inter-nodal signal wires or signal wires connecting terminators. A total bus resistance $R_T$ for the CAN can be determined as follows when the bus is functioning as intended with all component elements operating in accordance with specified requirements:

$$R_T = \Sigma_{i=1}^{k}(R_{Wi} + R_{Mi} + R_{Ti}/2) \quad [1]$$

wherein $R_T$ is the total resistance, $R_{Wi}$ is resistance for the CAN wires, $R_{Mi}$ is internal resistance for controller i, and $R_{Ti}$ is resistance for each of the terminators.

As shown in one embodiment, ADC1 227 is electrically configured to monitor a first voltage or drop ($V_S$) across $R_S1$ 237, ADC2 229 is electrically configured to monitor a third voltage ($V_H$) between the CAN-H 201 wire and an electrical ground, ADC3 231 is electrically configured to monitor a second voltage ($V_{CAN}$) between the CAN-H 201 wire and the CAN-L 203 wire of the communications bus, and ADC4 233 is electrically configured to monitor a fourth voltage ($V_L$) between the CAN-L 203 wire and the ground. In one embodiment the ADC3 231 arrangement may be eliminated. Each of the ADCs preferably has a sampling rate greater than 100 kHz to monitor the various voltages on the CAN bus at a rate that captures the first and second voltages during occurrence of a fault.

A communications fault is a malfunction that leads to a lost or corrupted message on the CAN bus thus interrupting communications between controllers in the CAN. A communications fault may be caused by an open link on CAN-H or CAN-L, or a short to power or to ground on CAN-H or CAN-L, or a short between CAN-H and CAN-L, and can be location-specific. A communications fault may be the result of a fault in one of the controllers, a fault in one of the communications links of the CAN bus, a fault in one of the power links of the power grid, or a fault in one of the ground links of the ground grid. Topology graphs can be developed, including a communications topology as described herein.

A short-lived CAN fault is defined as any malfunction of short duration that causes a temporary fault leading to a lost or corrupted message on the CAN bus. The short duration malfunction lasts for a short period of time, e.g., less than a second, and may be self-correcting. An intermittent CAN fault is defined as a short-lived CAN fault that occurs at least twice within a predefined time window, which may be ten seconds in one embodiment. A transient CAN fault is defined as a short-lived fault that occurs only once within the predefined time window.

Figure 3:
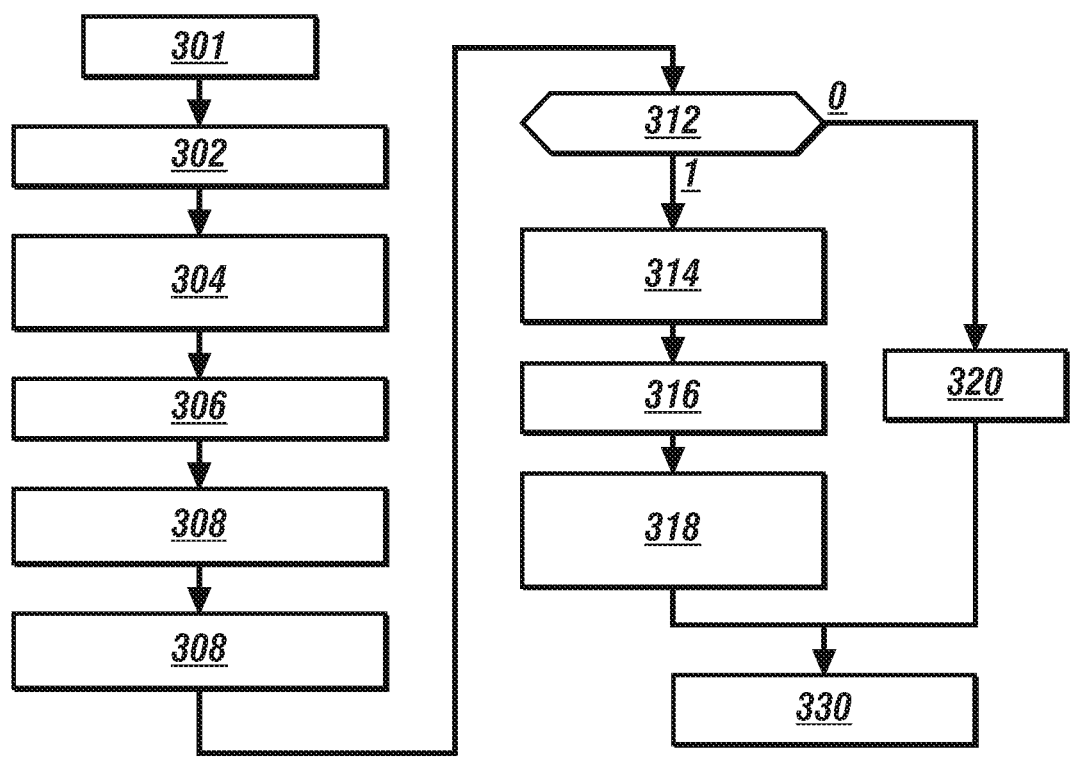
FIG. 3 illustrates an exemplary CAN monitoring routine to detect and isolate a fault in a CAN, in accordance with the disclosure.

FIG. 3 illustrates an exemplary CAN monitoring routine 300 to detect and isolate a communications fault in a CAN. Table 1 is provided as a key to routine 300 of FIG. 3, wherein the numerically labeled blocks and the corresponding functions are set forth as follows.

TABLE 1

| BLOCK | BLOCK CONTENTS |
|---|---|
| 301 | Time trigger |
| 302 | Read vehicle temperature |
| 304 | Generate resistance/distance mapping tables CAN-H short to ground CAN-H to CAN-L short |
| 306 | Collect $N_1$ data points for Vs, $V_H$, $V_L$, $V_{CAN}$ continuously |
| 308 | Identify all groupings of $N_2$ contiguous data points for $V_{CAN}$, Vs in a predetermined range |
| 310 | Remove first $N_3$ data points and concatenate all groups |
| 312 | Is the number of data points greater than $N_4$? |
| 314 | Calculate estimated resistance for each pair of data points |
| 316 | Calculate average of the estimated resistance for all the pairs of data points |
| 318 | Determine distance D using the two resistance/distance mapping tables |
| 320 | Not a short fault |
| 330 | Save detection results |

Two main functions are performed by CAN monitoring routine 300. First, a determination is made whether a wire short fault exists. And when a wire short fault is determined to exist, localization of the short is diagnosed. Preferably, wire short fault detection is accomplished through simple voltage measurements and resistance derivations on-board the monitoring controller thus alleviating any requirement for additional hardware or any type of complicated signal analysis. And, short localization is preferably accomplished through additional basic circuit analysis techniques utilizing the simple voltage measurements with reference to predetermined data tables.

CAN monitoring routine 300 is offered by way of non-limiting example. One having ordinary skill in the art will recognize and be able to implement alternative routines to achieve similar results and outcomes within the scope of the claimed subject matter. Execution of the CAN monitoring routine 300 is periodically triggered (301), with an initial action of reading and capturing the vehicle temperature (302). The purpose for capturing the vehicle temperature is to analytically accommodate effect of temperature on resistance in the various wires of the CAN by normalizing electrical resistance based upon deviation of temperature from a nominal value. The resistance can be temperature-normalized or adjusted in accordance with the following relationship:

$$R(T) = R(25)*(1 + \alpha(T - 25)) \quad [2]$$

wherein R(T) is the temperature-normalized resistance,

α indicates change in resistance in relation to a change in temperature, and is $3.9 \times 10^{-3} \Omega/°$ C. for copper wire, T is the vehicle temperature (° C.), 25 represents nominal temperature of 25° C., and R(25) is resistance at the nominal temperature of 25° C.

Two resistance/distance mapping tables are generated (304), including a first map related to a CAN-H short-to-ground fault at various locations, and a second map related to a CAN-H-to-CAN-L short fault at various locations. The resistance/distance mapping table are generated based upon knowledge of the communications topology of the CAN including node/controller connection resistances, wire material parameters such as conductor material and gauge, inter-nodal distances or length of the wires, order of connection for each of the known controller, etc. The wires have known resistances in relation to wire length $\lambda(\Omega/m)$ that has a known value at a nominal temperature, e.g., at 25° C. and is temperature-dependent. Each of the controllers has a connection resistance that has a known value at a nominal temperature, e.g., at 25° C. and is temperature-dependent.

A total resistance from the monitoring controller to each controller k on the communications bus can be determined in accordance with the following relationship when the fault is a short between CAN-L and CAN-H:

$$R_{Tk}(T) = \sum_{i=1}^{k}(2\lambda D_i(1+\alpha_w(T-25)) + R_{Mi}(25) \times (1+\alpha_{Mi}(T-25))) \quad [3\text{-}1]$$

wherein $R_{Tk}(T)$ is the total resistance,
$\lambda$ is the resistance rate ($\Omega$/m),
$D_i$ is distance (m) between controller i and controller i−1,
$\alpha_w$ is temperature coefficient ($\Omega$/° C.) for the wire cable,
$R_{Mi}$ is internal resistance of controller i imposed on the communications bus,
T is temperature (° C.), and
$\alpha_{Mi}$ is is temperature coefficient ($\Omega$/° C.) for controller i.

Using the known parameters and the relationship correlating total resistance to distances along the CAN bus to locations of shorts between CAN-L and CAN-H wires (i.e. inter-nodal), tables associating total resistance to distance at current temperature conditions are built and stored, preferably in a working section of non-volatile memory of the monitoring controller.

A total resistance from the monitoring controller to each controller k on the communications bus can be determined in similar fashion in accordance with the following relationship when the fault is a short between CAN-H and ground:

$$R_{Tk}(T) = \sum_{i=1}^{k}(\lambda D_i(1+\alpha_w(T-25)) + R_{Mi}(25) \times (1+\alpha_{Mi}(T-25))) \quad [3\text{-}2]$$

Again, using the known parameters and the relationship correlating total resistance to distances along the CAN bus to locations of shorts from CAN-H wires to ground (i.e. inter-nodal), tables associating total resistance to distance at current temperature conditions are built and stored, preferably in a working section of non-volatile memory of the monitoring controller.

One skilled in the art will also recognize that resistance/distance mapping tables may be built offline as part of the design and calibration of the particular CAN system to which the present diagnostic may be applied. Such tables are preferably stored as look up tables in non-volatile memory, and would be constructed using knowledge of the communications topology of the CAN including node/controller connection resistances, wire material parameters such as conductor material and gauge, inter-nodal distances or length of the wires, order of connection for each of the known controller, etc. However, an additional table dimension to accommodate temperature would require significantly more non-volatile memory usage. One having ordinary skill in the art is able to construct such resistance/distance mapping tables using empirical data from actual CAN bus hardware or from design data.

Voltage sampling of first and second voltages Vs and $V_{CAN}$ is accomplished. Preferably filtering is performed. Therefore, for example, a predetermined number ($N_1$) of samples or data points for first and second voltages Vs and $V_{CAN}$ are collected over a period of time. $N_1$ is 5632 in one embodiment (306). The corresponding data points for $V_H$ and $V_L$ may also be collected to provide a numerical check for Vs and $V_{CAN}$, but are not necessary for execution of the CAN monitoring routine.

Groupings of a predetermined number ($N_2$) of contiguous samplings or data points for first and second voltages Vs and $V_{CAN}$ within a predetermined range are identified (308) wherein $N_2$ is sampling rate-dependent, and is 15 samplings or data points in one embodiment. The predetermined range is a range determined to be indicative of a wire short fault and may be determined using empirical data from actual CAN bus hardware or from design data. The first $N_3$ data samplings or data points of each of the aforementioned groupings are discarded (310), wherein $N_3$ is sampling rate-dependent, and is 5 samplings or data points in one example. The purpose of removing the first $N_3$ points from further consideration is similar to conventional "debouncing" of measurements to remove potentially problematic or unstable data. The remaining data from all of the groupings are concatenated into a single data file for analysis. The quantity of data points in the file is evaluated to determine whether the number of data points is greater than $N_4$, which is 10 samplings in one embodiment, though $N_4$ is preferably variable in accordance with, for example, accuracy of voltage measurements or bus load (312).

When the number of data points is less than $N_4$ (312) (0), the results indicate absence of a short fault in the communications bus (320), and the detection results are captured and stored (330).

When the number of data points is greater than $N_4$ (312) (1), the results indicate detection of a short fault in the communications bus with a corresponding need to determine location of the fault in the CAN. The data points are analyzed by calculating a resistance for each pair of the Vs and $V_{CAN}$ data points (314) in accordance with the following relationship:

$$\hat{R}_T = \frac{V_{HL}}{V_S} R_S \quad [4]$$

wherein $\hat{R}_T$ is estimated bus resistance, and
$R_s$ is resistance of the shunt resistor.

An average value of all the estimated bus resistances is calculated (316) and employed to reference the resistance/distance mapping tables to determine a distance (318). The calculated distance indicates location of a fault, if any, in the communications bus, and both can be captured and stored (330).

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A controller area network (CAN) comprising:
a CAN bus including a CAN-H wire and a CAN-L wire;
a pair of CAN bus terminators located at opposite ends of the CAN bus, each terminator having a corresponding known terminator resistance value;
a plurality of nodes including controllers wherein at least one of said controllers comprises a monitoring controller; and
said monitoring controller comprising:
a CAN transceiver signally connected to the CAN-H wire through a shunt resistor having a known resistance,
a CAN-H wire voltage monitor to monitor CAN-H voltage, a CAN-L wire voltage monitor to monitor CAN-L voltage,
a shunt resistor voltage monitor to monitor voltage across said shunt resistor,
a processor and memory, to:
  calculate a total resistance of the CAN bus in accordance with the following relationship:

$$R_T = \frac{V_{HL}}{V_S} R_S$$

wherein $R_T$ is total resistance of the CAN bus,
    $R_S$ is the resistance of the shunt resistor,
    $V_S$ is voltage across said shunt resistor,
    $V_{HL}$ is the voltage difference between CAN-H voltage and CAN-L voltage;
  detect a wire short fault in the CAN bus based upon said total resistance of the CAN bus; and
  determine a location of said wire short fault in the CAN bus based upon said total resistance of the CAN bus.

2. The controller area network (CAN) of claim 1, wherein determine a location of said wire short fault in the CAN bus comprises:
  reference a predetermined table correlating CAN bus location to said total resistance of the CAN bus.

3. The controller area network (CAN) of claim 1, wherein said voltages are filtered.

* * * * *